UNITED STATES PATENT OFFICE.

CHARLES W. THOMAS, OF WAYNE, PENNSYLVANIA.

REFRACTORY PRODUCT AND METHOD OF MAKING THE SAME.

1,344,461. Specification of Letters Patent. Patented June 22, 1920.

No Drawing. Application filed August 7, 1918. Serial No. 248,784.

*To all whom it may concern:*

Be it known that I, CHARLES W. THOMAS, a citizen of the United States, residing in Wayne, Delaware county, Pennsylvania, have invented Refractory Products and Methods of Making the Same, of which the following is a specification.

This invention relates to the manufacture of refractory products such as refractory mortars, bricks, blocks and other molded shapes and has for one of its objects the provision of a refractory body or compound which shall not require burning or firing before use and which therefore, may be made more cheaply and with a smaller percentage of loss from breakage and other causes than is now possible with similar products;—the composition and treatment of the ingredients being such that my product may be made largely from raw materials, in less time than is ordinarily required and is capable of withstanding high temperatures as well as abrasive action for prolonged periods without serious deterioration.

It is further desired to provide a product having the above noted characteristics which shall be of uniformly high structural strength so that it will be capable of withstanding rough handling, while being less affected by atmospheric conditions.

A further object of my invention is to provide a refractory material which shall include a binder capable of imparting to the product a relatively high structural strength which will permit it to be handled, shipped and built into place with but a minimum loss and breakage, etc., and which shall, under conditions of use, not only become porous but when exposed to high temperatures, develop an increased strength by reason of the sintering together of its particles;—the invention also contemplating a relatively simple, inexpensive and practical method of making the above product as well as the manufacture of an acid refractory not subject to that degree of expansion destructive to the furnace or oven structure when in use.

According to my invention I employ Portland or other suitable hydraulic cement as a binder for suitable refractory material such as raw unburnt quartzite and the like, and in some cases I may employ it in a similar manner with refractory aluminous bodies such as stone-like clay. In using the term "quartzite" my intention is to include those highly silicious bodies such as raw unburnt ganister, while excluding silica sand and the like.

The material constituting the body of the refractory made in accordance with my invention is ground so that its largest particles are less than a predetermined size, after which it is mixed with cement and water in proportions necessary to constitute a bond. It is thereafter molded into the desired shape and is permitted to set so that the finished structure has sufficient mechanical strength to permit it to be stored, handled, shipped or built into a refractory structure such as a furnace lining without its having been previously fired.

Thereafter when it is exposed to the high temperature incident upon the use of the furnace, etc., of which it forms a part, it changes from a relatively compact dense mass to one which is relatively porous, owing to the changes occurring in the cement and ganister or other body of the structure due to the high temperature conditions; in addition to which its particles are caused to cohere by reason of a sintering action so that its structural strength is increased.

The cast or molded structure made in accordance with my invention obtains sufficient strength for handling, storing, shipping, and setting into place for use, from the binding force of the cement which has a peculiar affinity for quartzite such as is used for refractory purposes; after which, under the high temperature conditions of the furnace, it loses the strength due to the hydraulic setting of the cement and at such temperature, it simultaneously gains strength through incipient fusion or sintering of the cement and quartzite.

The quartzite used by me requires not more than ten per cent. and sometimes not more than three per cent. of cement to secure sufficient structural strength for the purposes intended, and the use of hydraulic cement for binding quartzite into a refractory structure permits of the latter being formed under high pressure in a mold, thereby reducing the percentage of cement required to give strength, increasing the refractoriness, and making possible the increased speed in manufacture of the structure.

In a typical case I grind ganister rock to such a fineness that the largest grain will pass through a screen of eight meshes to one inch and after placing one thousand pounds of this material in a suitable mixer, moisten it with water while it is being agitated. I then add one hundred pounds of Portland cement and continue the mixing until this is thoroughly moistened and evenly distributed throughout the ground rock; the water being in such quantity that after the mixing is completed the material may be molded into desired shapes. The molded bricks, blocks, etc., made from the above mixture either by hand or machine are now placed on pallets on cars where they are allowed to remain until finally set; generally being kept sufficiently moist to allow of their proper hardening or setting. When such setting has occurred, the bricks may be shipped, stored, or built into a structure such as a furnace hearth or lining in which they are to be used. When such furnace is fired, the cement and ganister are calcined at a temperature sufficiently high and the brick or structure as a consequence becomes more porous. Its particles thereupon become sintered together but retain their high refractory characteristics owing to the relatively small amount of free lime present in them, as well as to the fact that whatever lime of the cement may be present has already been fired to a high degree, and also because this lime is for the most part chemically combined with the other ingredients of the cement.

In practising my invention I have found that in no instance is it necessary to use more than 10 per cent. of cement binder and I have obtained very satisfactory results with three per cent. cement. For refractories made by my process and intended to withstand very high temperatures, such as for instance are usual in a byproduct coke oven, it is advisable to use the smallest percentage of cement that will give to the brick the necessary strength for handling, shipping and setting into the furnace or oven wall; and for such products only the best quartzite should be used to make up the body of the object. Such a quartzite, e. g. #1 ganister, contains not less than ninety-seven or ninety-eight per cent. silica, not more than about three quarters of one per cent. of iron, and practically no other highly fluxing elements in addition to the alumina present. It is obvious that in order to carry out the above process the hydraulic cement should be of the best quality.

In carrying out my invention I usually prefer, for the most refractory uses, to increase the pressure exerted upon the materials being formed into a brick or other shape, in proportion as the percentage of cement in the mixture is decreased; thereby securing the necessary strength for shipping, etc., as well as providing a structure whose structural strength will increase at the time of and after the sintering part of my process, and giving a greater abrasion resistance in the object while in use.

As a further example of my invention 1 add water to one thousand pounds of #1 ganister and three per cent. Portland cement, having a high cementitious quality, preparing and mixing these materials in accordance with the foregoing "typical case". This mixture, usually carrying about six per cent. water, while being molded, is subjected to a pressure sufficient to reduce its volume from thirty to fifty per cent., after which the molded objects are treated as above described.

If desired or found advisable the structures molded in accordance with my invention may be hardened by exposure to steam under a pressure, for example, of from one hundred to one hundred and ten pounds per square inch, for a period, in a typical case, of ten hours. It will be understood that I do not limit my process to any particular composition of cement, except that when this contains sixty per cent. calcium or over the process is limited to about ten per cent. or less of cement though when the calcium content of the cement falls below sixty per cent. I may use it in correspondingly increased percentages. The pressures used in molding my product are in inverse proportion to the percentage of cement used, when the cementitious quality of the cement has been taken into account.

Obviously the sizes of the particles to which the ganister rock is crushed could be varied without departing from my invention, being regulated according to the nature of the raw materials and to the use for which the finished product is intended. In any case it will be noted that by the use of a relatively small quantity of hydraulic cement as a binder I am enabled to make tough, compact blocks of refractory material which by repeated experiment I have found to be equal and frequently superior to those commonly employed. They do not however require the prolonged time and the costly firing now necessary in the manufacture of similar products. Moreover by avoiding the firing operation I not only save the expense thereof but avoid the large percentage of loss due to breakage which at the present time materially increases the cost of such refractories.

A further advantage of my refractory product and process of making the same is due to the small percentage of free lime contained which makes possible its use at high temperatures without its becoming plastic or tending to disintegrate, as is frequently the case where the percentage of free lime is higher.

If desired any suitable hardener such as calcium sulfate may be added to the mixture of quartzite and cement prior to its being cast.

I claim:

1. The process which consists in mixing unburnt raw quartzite with Portland cement, a hardener, and water; molding the mixed materials; permitting the molded structure to set; and thereafter exposing the structure to a temperature sufficient to calcine the cement and sinter the refractory material.

2. The process which consists in mixing raw quartzite with hydraulic cement up to approximately ten per cent. and sufficient water to permit the mixture to be molded; molding said mixture; allowing the cement to set; building the molded object into a refractory structure; and operating said structure to expose said object to a sintering temperature.

3. As a new article of manufacture a refractory consisting of a molded structure of raw unburnt quartzite containing about 97 per cent. silica and hydraulic cement.

4. As a new article of manufacture a refractory consisting of raw unburnt ganister and between three and ten per cent. of hydraulic cement.

In witness whereof I affix my signature.

CHARLES W. THOMAS.